US012649808B2

(12) United States Patent
Bawiskar et al.

(10) Patent No.: US 12,649,808 B2
(45) Date of Patent: Jun. 9, 2026

(54) CONTROLLED LONG CHAIN BRANCHING IN EPDM BY POST-REACTOR MODIFICATION

(71) Applicant: Dow Global Technologies LLC, Midland, MI (US)

(72) Inventors: Santosh S. Bawiskar, Lake Jackson, TX (US); Guang Ming Li, Lake Jackson, TX (US); Tianzi Huang, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1199 days.

(21) Appl. No.: 17/621,935

(22) PCT Filed: Jun. 18, 2020

(86) PCT No.: PCT/US2020/038468
§ 371 (c)(1),
(2) Date: Dec. 22, 2021

(87) PCT Pub. No.: WO2020/263681
PCT Pub. Date: Dec. 30, 2020

(65) Prior Publication Data

US 2022/0275121 A1     Sep. 1, 2022

Related U.S. Application Data

(60) Provisional application No. 62/866,766, filed on Jun. 26, 2019.

(51) Int. Cl.
| | |
|---|---|
| *C08F 210/18* | (2006.01) |
| *C08F 8/00* | (2006.01) |
| *C08F 210/16* | (2006.01) |
| *C08L 23/16* | (2006.01) |
| *C09D 123/16* | (2006.01) |
| *C09J 123/16* | (2006.01) |

(52) U.S. Cl.
CPC .............. *C08F 210/18* (2013.01); *C08F 8/00* (2013.01); *C08F 210/16* (2013.01); *C08J 2323/16* (2013.01); *C08L 23/16* (2013.01); *C09D 123/16* (2013.01); *C09J 123/16* (2013.01)

(58) Field of Classification Search
CPC ........ C08F 210/18; C08F 210/16; C08F 2/54; C08J 2323/16; C08J 2423/16; C08J 7/123; C08L 23/16; C09D 123/16; C09J 123/16
See application file for complete search history.

(56) References Cited

U.S. PATENT DOCUMENTS

| | | | |
|---|---|---|---|
| 3,563,870 A | 2/1971 | Tung et al. | |
| 5,414,027 A | 5/1995 | DeNicola, Jr. et al. | |
| 5,508,319 A | 4/1996 | DeNicola, Jr. et al. | |
| 5,541,236 A | 7/1996 | DeNicola, Jr. et al. | |
| 5,605,936 A | 2/1997 | DeNicola, Jr. et al. | |
| 5,674,613 A | 10/1997 | Dharmarajan et al. | |
| 6,300,451 B1 | 10/2001 | Mehta et al. | |
| 6,376,620 B2 | 4/2002 | Rowland et al. | |
| 6,384,162 B1 | 5/2002 | Zahalka et al. | |
| 6,632,854 B1 | 10/2003 | Charlier | |
| 6,699,919 B1 | 3/2004 | Charlier | |
| 7,705,172 B2 | 4/2010 | Ijpeij et al. | |
| 7,956,140 B2 | 6/2011 | Ijpeij et al. | |
| 8,101,696 B2 | 1/2012 | Konze et al. | |
| 2009/0012246 A1 | 1/2009 | Ijpeij et al. | |
| 2009/0137830 A1 | 5/2009 | Ijpeij et al. | |
| 2009/0298964 A1* | 12/2009 | Jacob ................. | C08K 5/34924 522/78 |
| 2014/0051809 A1 | 2/2014 | Tse | |
| 2015/0259491 A1* | 9/2015 | LiPiShan ................... | C08J 9/00 428/36.9 |
| 2016/0355622 A1 | 12/2016 | Ichino et al. | |
| 2017/0362350 A1* | 12/2017 | Canich ................. | C08F 210/16 |
| 2018/0208757 A1 | 7/2018 | Jiang et al. | |
| 2018/0244896 A1 | 8/2018 | Ichino et al. | |
| 2019/0345318 A1 | 11/2019 | Li Pi Shan et al. | |

FOREIGN PATENT DOCUMENTS

| | | |
|---|---|---|
| CN | 102471551 A | 5/2012 |
| CN | 104583304 A | 4/2015 |
| CN | 107922689 A | 4/2018 |
| CN | 108473737 A | 8/2018 |

(Continued)

OTHER PUBLICATIONS

CN202080050941.X English Translation of Office Action 1 Search Report Dated Jun. 21, 2023.

(Continued)

*Primary Examiner* — Joseph S Del Sole
*Assistant Examiner* — David L Miller
(74) *Attorney, Agent, or Firm* — Boyle Fredrickson S.C.

(57) ABSTRACT

The present disclosure provides a process. In an embodiment, the process includes providing a neat ethylene/propylene/non-conjugated polyene terpolymer (n-terpolymer) having a Mooney viscosity (ML (1+4) at 125C) less than 100 Mooney units (MU). The process includes exposing the n-terpolymer to electron beam radiation at a dosage from 0.2 megaRad (MRad) to 1.3 MRad. The process includes forming a branched ethylene/propylene/non-conjugated polyene terpolymer (b-terpolymer) having a Mooney viscosity ML (1+4) at 125C from 25 MU to 135 MU.

6 Claims, No Drawings

(56)     References Cited

FOREIGN PATENT DOCUMENTS

EP          0519386  A1     12/1992

OTHER PUBLICATIONS

CN202080050941,X English Translation of Office Action 1 Dated Jun. 21, 2023.
M. Stelescu et al., Polymers 2018, vol. 10, No. 11, 1206.
G. Przybytniak, "Crosslinking of Polymers in Radiation Processing", Mar. 27, 2017, retrieved from internet: http://www.ichtj.waw.pl/ichtj/publ/monogr/sun2017/sun-chapter11.pdf [retrieved on Sep. 9, 2020].

* cited by examiner

1

CONTROLLED LONG CHAIN BRANCHING IN EPDM BY POST-REACTOR MODIFICATION

BACKGROUND

Known are ethylene-propylene-diene monomer terpolymers (EPDM) having a molecular architecture that includes long chain branching (LCB). LCB introduces side chains into the backbone of the EPDM that alter the rheological and physical properties of the EPDM significantly, e.g., the elasticity and shear thinning character of the EPDM is increased with LCB. The benefits of high-LCB EPDM compared to non-branched EPDM include reduced cold flow, higher green strength, higher collapse resistance during extrusion of hollow parts, better foamability, faster extrusion rates, faster mixing, lower energy consumption in internal mixers, higher filler loading and reduced melt fracture.

The choice of catalyst used in the polymerization and the polymerization process conditions provide methods of adapting the level of LCB in the EPDM architecture. Ziegler Natta (Z-N) catalysts (e.g., titanium-based catalyst or vanadium-based catalyst), can introduce LCB into an EPDM during the polymerization process. However, the extent of LCB is difficult to control, e.g., the Z-N polymerization process is prone to forming undesirable crosslinked EPDM that leads to gel formation. The Z-N polymerization process also produces EPDM with broad composition distribution and broad molecular weight distribution.

Metallocene catalysts (e.g., zirconium based catalyst), produce EPDM in a solution polymerization process. Metallocene catalysts generally produce EPDM having a more uniform composition distribution, narrower MWD and a more linear molecular architecture compared to Z-N catalyzed EPDM. However, metallocene catalysts typically produce low levels of LCB compared to Z-N catalyzed EPDM.

Consequently, the art recognizes the need for high-LCB EPDM. The art further recognizes the need for methods of increasing LCB in metallocene catalyzed EPDM.

SUMMARY

Disclosed herein is a process. In an embodiment, the process includes providing a neat ethylene/propylene/non-conjugated polyene terpolymer (n-terpolymer) having a Mooney viscosity (ML (1+4) at 125° C.) less than 100 Mooney units (MU). The process includes exposing the n-terpolymer to electron beam radiation at a dosage from 0.2 megaRad (MRad) to 1.3 MRad. The process includes forming a branched ethylene/propylene/non-conjugated polyene terpolymer (b-terpolymer) having a Mooney viscosity ML (1+4) at 125° C. from 25 MU to 135 MU.

Also disclosed herein is composition. In an embodiment, the composition includes a branched ethylene/propylene/non-conjugated polyene terpolymer (b-terpolymer) comprising: (A) a Mooney viscosity (ML 1+4 @125° C.) from 35 MU to 120 MU; (B) a rheology ratio from 55 to 110; and (C) a phase angle δ from 20° to 39°.

Definitions

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, (whether polymerized or otherwise), unless stated to the contrary. In contrast, the term, "consisting essentially of" excludes from the scope of any succeeding recitation any other component, step, or procedure, except-ing those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer," is a polymer that contains more than 50 weight percent polymerized ethylene monomer (based on the total amount of polymerizable monomers) and, optionally, may contain at least one comonomer. Eth-ylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyeth-ylene) include low density polyethylene (LDPE) and linear polyethylene. Nonlimiting examples of linear polyethylene include linear low density polyethylene (LLDPE), ultra-low density polyethylene (ULDPE), very low density polyeth-ylene (VLDPE), multi-component ethylene-based copoly-mer (EPE), ethylene/α-olefin multi-block copolymers (also known as olefin block copolymer (OBC)), single-site cata-lyzed linear low density polyethylene (m-LLDPE), substan-tially linear, or linear, plastomers/elastomers, and high den-sity polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, com-prising Group 4 transition metals and ligand structures such as metallocene, non-metallocene metal-centered, heteroaryl, heterovalent aryloxyether, phosphinimine, and others. Com-binations of heterogeneous and/or homogeneous catalysts also may be used in either single reactor or dual reactor configurations. In an embodiment, the ethylene-based poly-mer does not contain an aromatic comonomer polymerized therein.

The terms "interpolymer," and "copolymer," refer to a polymer prepared by the polymerization of at least two different types of monomers. These generic terms include both classical copolymers, i.e., polymers prepared from two different types of monomers, and polymers prepared from more than two different types of monomers, e.g., terpolymers, tetra polymers, etc.

The term "electron beam radiation" or ("e-beam")," as used herein, includes generating an electron beam from a heated cathode filament (typically tungsten). The electrons emitted from the cathode are accelerated in an electric field applied between cathode and anode. The energy gain of the electron beam is proportional to the acceleration voltage. The energy is measured in eV (electron-volts) and accelerators up to 10 MeV are commercially available. The dosage of e-beam is measured in megarad (MRad). When e-beam enters a polymer it ionizes and excites the molecules resulting in the displacement of hydrogen atoms and formation of free radicals. The combination of two free radicals forms branching. The type of branching formed by this method is H-type or tetrafunctional.

The term "entanglement molecular weight," as used herein, is described as follows. A plot of the log of structurally undeformed mechanical properties of a polymer melt plotted against the log of molecular weight exhibits an initial, weak linear dependence followed by a transition, at approximately 10 kDa, to exhibit a strong dependence on molecular weight. The "transition molecular weight" is termed the "entanglement molecular weight." Polymers above the entanglement molecular weight are useful as plastics while those below the entanglement molecular weight display features of low molecular weight materials, generally brittle powders. For example, candle wax is low molecular weight polyolefin of the same molecular structure as polyethylene.

The term "long-chain branching," or ("LCB")," as used herein, refers to the presence of side chains on an ethylene/propylene/diene-monomer terpolymer with the side chain molecular weight being greater than the entanglement molecular weight of the polymer.

The term "polymer," refers to a material prepared by reacting (i.e., polymerizing) a set of monomers, wherein the set is a homogenous (i.e., only one type) set of monomers or a heterogeneous (i.e., more than one type) set of monomers. The term polymer as used herein includes the term "homopolymer", which refers to polymers prepared from a homogenous set of monomers, and the term "interpolymer" as defined below.

The term "terpolymer," refers to a polymer prepared by the polymerization of three different types of monomers.

TEST METHODS

Mooney viscosity test: EPDM Rubber Mooney Viscosity is measured in a Mooney shearing disk viscometer in accordance with ASTM 1646-04. The instrument is an Alpha Technologies Mooney Viscometer 2000. The torque to turn the rotor at 2 rpm is measured by a torque transducer. The sample is preheated for 1 minute (min) after the platens is closed. The motor is then started and the torque is recorded for a period of 4 min. Results are reported as "ML (1+4) at 125° C." in Mooney Units (MU). The term "ML" indicates that a large rotor, "Mooney Large," is used in the viscosity test, where the large rotor is the standard size rotor. Mooney viscosity (MV) measures the resistance of polymer to flow at a relatively low shear rate and indicates the flowability of the polymer.

Mooney relaxation area (MLRA) data is obtained from the Mooney viscosity measurement where the test sample is relaxed after the rotor is stopped. At the end of the Mooney viscosity test, rotation of the disk is stopped within 0.1 seconds (s). Collection of relaxation data typically begins 1 s after the rotor is stopped and continues for at least 2 minutes (min) after the rotor is stopped. The MLRA value reported is the integrated area under the Mooney torque-relaxation time curve from 1 s to 120 s (MLRA (1'+4'+2')). The MLRA value indicates the degree of elasticity of a polymer and can be regarded as a stored energy term. Higher MRLA values indicate that, after the removal of an applied strain, the test sample stores more energy and requires more time to relax (i.e., to dissipate the stored energy). Polymers with more elasticity (e.g., those with more long chain branched structure), typically exhibit higher MLRA values compared to less elastic polymers (e.g., those having less long chain branched structure). MLRA is reported in Mooney Unit-seconds (MU·s).

The term "MLRA/ML ratio," as used herein, is the Mooney Relaxation Area-to-Mooney viscosity ratio and is an abbreviated form for "MLRA/ML(1+4)@125° C." The MLRA/ML ratio indicates the degree of melt elasticity of a polymer and is directly proportional to the degree of melt elasticity. The MLRA/ML ratio is reported in seconds (s).

Rubber rheology property analysis (RPA): Rubber rheology properties analysis is performed in accordance with ASTM D6204 with a rotorless oscillating shear rheometer (i.e., rubber process analyzer (RPA)). RPA frequency sweep test is performed using an Alpha Technologies RPA 2000. The testing sample is cut out with a Cutter 2000R. Sample size is between 5 and 7 grams. The test specimen is considered to be of proper size (116 to 160% of the test cavity volume) when a small bead of rubber compound is extruded uniformly around the periphery of the dies as they are closed. The sample is placed between two pieces of Mylar film. A frequency sweep is performed at 125° C. using a 5% strain for the neat terpolymers. A frequency sweep is performed at 100° C. using a 5% strain for the terpolymer compositions. The frequency range is from 0.1 radians per second (rad/s) to 100 rad/s. The stress response was analyzed in terms of amplitude and phase, from which, the storage shear modulus (G'), loss shear modulus (G"), complex viscosity (V), tan delta (i.e., phase angle δ), and complex shear modulus G* were calculated. Modulus values are reported in kilopascal (kPa), phase angle is reported in degrees, and viscosity is reported in pascal-seconds (Pa·s).

The term "phase angle δ," as used herein, is the phase lag exhibited between an applied stress and the resultant strain imparted by the stress. For a given dynamic mechanical study, the phase angle δ is measured at a complex shear modulus, G*, value of 100 kPa and 125° C. When comparing the phase angle δ of a group of polymers, decreased phase angle δ values generally indicate a polymer is more elastic.

The term "rheology ratio" (or "RR"), is calculated as the ratio of the complex viscosity at 0.1 rad/sec and 125° C. to the complex viscosity at 100 rad/sec and 125° C.; RR equals V0.1/V100 at 125° C.

High Temperature Gel Permeation Chromatography test ("HT GPC test"): The HT GPC test is conducted with a POLYMERCHAR (Valencia, Spain) HT GPC system consisting of an infra-red concentration/composition detector (IR-5 detector), a PDI 2040 laser light scattering detector (Agilent), and a four capillary bridge viscometer (Malvern) and allows determination of number average molecular weight ($M_N$), weight average molecular weight ($M_W$), and zeta average molecular weight ($M_Z$).

The columns are four mixed A LS 20 micrometer columns (Agilent). The detector compartments are operated at 160° C. and the column compartment is operated at 150° C. The carrier solvent is 1,2,4-trichlorobenzene (TCB) containing approximately 250 ppm of butylated hydroxytoluene (BHT) and is nitrogen sparged.

The HT GPC system is calibrated with 21 narrow molecular weight distribution polystyrene standards. The molecular weights of the standards ranges from 580 to 8,400,000 and are arranged in six 6 "cocktail" mixtures having at least a decade of separation between individual molecular weights. Molecular weight data ($M_{ps}$), of the resultant polystyrene standards is converted to polyethylene molecular weight data ($M_{pe}$), by the equation (1): $M_{pe}=A(M_{ps})^B$; where the value of A is determined in an iterative manner and is approximately 0.42 and the value of B is 1.0. A fifth order polynomial was used to fit the respective polyethylene-equivalent calibration points obtained from the equation (1) to their observed elution volumes for each polystyrene standard.

$M_N$, $M_W$, and $M_Z$ are calculated according to the following equations:

$$Mn = \frac{\sum_i Wf_i}{\sum_i \left(\frac{Wf_i}{M_i}\right)} \quad (2)$$

$$Mw = \frac{\sum_i (Wf_i * M_i)}{\sum_i Wf_i} \quad (3)$$

$$Mz = \frac{\sum_i (Wf_i * M_i^2)}{\sum_i (Wf_i * M_i)} \quad (4)$$

where, $Wf_i$, is the weight fraction of the i-th elution component and $M_i$, is the molecular weight of the i-th elution component. The molecular weight distribution (MWD) is expressed as the ratio of $M_W$ to $M_N$; $M_W/M_N$. The A value is determined by adjusting A value in equation (1) until the value of Mw from equation (3), and the corresponding retention volume polynomial, agree with the independently determined value of Mw obtained in accordance with a linear homopolyethylene reference having a known $M_W$ of 120,000 and intrinsic viscosity (1.873 dL/g). The same linear homopolyethylene reference was used to determine the response factors of the IR-5 detector, the laser light scattering detector, and the viscometer. Determination of the response factors is implemented in a manner consistent with that published in the American Chemical Society Publications: "A Strategy for Interpreting Multidetector Size-Exclusion Chromatography Data I," in "Chromatography of Polymers (ACS Symposium Series, #521)," T. H. Mourey and S. T. Balke, Chap 12, p180, (1993); and "A Strategy for Interpreting Multidetector Size-Exclusion Chromatography Data II," in "Chromatography of Polymers (ACS Symposium Series, #521)." S. T. Balke, R. Thitiratsakul, R. Lew, P. Cheung, T. H. Mourey, Chap 13, p199, (1993) the entire contents of both which is incorporated by reference herein. The IR-5 detector was further calibrated with EPDM resins before e-beam treatment.

For the irradiated terpolymers terpolymers exposed to e-beam treatment), candidates for HT GPC analysis are picked randomly and cut into segments. A blend of segments cut from various terpolymers is used to prepare each HT GPC analyte in order to overcome any radiation heterogeneity within individual terpolymer samples. HT GPC analytes are prepared at a concentration of approximately of 2.0 milligrams per milliliter (mL) using approximately 60 milligrams of cut segments and 30 mL TCB dissolved in a glass bottle having a cap with an aluminum foil liner. The analytes are heated at 150° C. for 3 h with gentle agitation and hot-transferred into injection vials. The solution in the injection vial is then heated at 160° C. for 30 min prior to injection. The injection volume is 200 microliters and the flowrate is 1.0 mL per min. The analytes are filtered upon injection, via an in-line filter to remove insoluble materials.

The term, "initial analyte," as used herein, is the mass of the analyte injected into the HT GPC system. The term, "filtered analyte," as used herein, is the mass of the analyte that exits the in-line filter and is recovered from the IR-5. A weight fraction for a "soluble fraction," is the result of the filtered analyte divided by the initial analyte. For samples with insoluble fractions, the reported values are only for the soluble portion of the analyte.

The four capillary bridge viscometer measures an intrinsic viscosity ($\eta$) of the analyte. A g' value of the analyte is calculated as $\eta$ divided by $\eta_{linear}$, (i.e., $g'=\eta/\eta_{linear}$), where $\eta_{linear}$ is the intrinsic viscosity of a linear polymer having the same molecular weight.

Mass recovery test: Mass recovery (M-REC) is calculated by the expression M-REC=100×[(initial analyte–filtered analyte)/initial analyte] using the analyte mass values obtained in the HT GPC test.

It is understood that polymers with internal crosslinking form insoluble gels that are quantifiably detectable by mass recovery analysis. It is further understood that polymers exhibiting mass recovery of greater than, or equal to, 85% are absent of internal crosslinking.

The g' value of irradiated terpolymers is used to calculate the amount of long chain branching. The change of the g' value (i.e., the ratio of the g' value of the irradiated terpolymer divided by the g' value of the same, non-irradiated terpolymer), is calcualted following the pioneering study of long chain branching by Zimm and Stockmeyer, "The Dimensions of Chain Molecules Containing branches and Rings," B. H. Zimm, W. H. Stockmayer, The Journal of Chemical Physics, Vol. 17, page 1301-1314, 1949, the entire contents of which is incorporated by reference herein. The g value used in the reference was converted to g' value using the following equation with an emperical value of 0.5:

$$g^\epsilon = g'$$

Based on the calculated g' values, the long chain branching per chain of each resin was calculated based on the linear correlation of the branching number of tetra-functional (H-shaped) branched polymer and g values by Zimm and Stockmayer.

Monomer content test: Ethylene content and propylene content of the terpolymers, as weight percentage, is determined by Fourier Transform Infrared (FTIR) analysis in accordance with ASTM D3900. ENB content of the terpolymers as a weight percentage is determined by Fourier Transform Infrared (FTIR) analysis in accordance with ASTM D6047.

Residual elemental analysis test: Residual elemental analysis is performed using both Inductively Coupled Plasma-Atomic Emission Spectroscopy (ICP-AES) and X-ray Fluorescence (XRF) techniques. For ICP-AES analysis, the samples are weighed into quartz tubes and 1 mL water and 3 mL nitric acid are added to the samples. The samples are placed in a hot block at 115° C. for 30 minutes. The samples are then placed in an UltraWave Microwave oven where they are digested at 250° C. After digestion in the microwave, the samples are diluted and analyzed by a Perkin Elmer ICP for aluminum, calcium, chromium titanium and vanadium. For XRF analysis, the samples are plagued in a hot press at 260° F. The samples are then rinsed with distilled water and then with acetone and chlorine content is measured by XRF. Results are reported in parts per million (ppm).

Density is measured in accordance with ASTM D792, Method B. The result is recorded in grams per cubic centimeter (g/cc or g/cm$^3$).

DETAILED DESCRIPTION

Process

The present disclosure provides a process. In an embodiment, the process comprises providing an ethylene/propylene/non-conjugated polyene terpolymer. The terpolymer is neat and has a Mooney viscosity less than 100 Mooney units, wherein the Mooney viscosity test condition is ML (1+4) at 125° C. The process includes exposing the neat terpolymer to electron beam radiation. The neat terpolymer is exposed to electron beam radiation at a dosage from 0.2 megaRad (MRad) to 1.3 MRad. The process includes forming a branched ethylene/propylene/non-conjugated polyene terpolymer. The branched terpolymer has a Mooney viscosity from 25 Mooney units to 135 Mooney units.

The process includes providing a terpolymer. In an a embodiment, the terpolymer is an ethylene/α-olefin/non-conjugated polyene comprising, in polymerized form, ethylene, an α-olefin, and a non-conjugated polyene. Suitable examples of α-olefins include C3-C20 α-olefins or C3-C8 α-olefins. Suitable examples of nonconjugated polyenes include C4-C40 nonconjugated dienes.

In an embodiment, the α-olefin is a C3-C8 aliphatic α-olefin. In a further embodiment, the α-olefin is selected from the group consisting of propylene, 1-butene, 1-hexene and 1-octene. In an embodiment, the α-olefin is propylene.

In an embodiment, the nonconjugated polyene is an acyclic diene or a cyclic diene. Nonlimiting examples of acyclic dienes include straight chain acyclic dienes, such as 1,4-hexadiene and 1,5-heptadiene; and branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, and 1,9-deca-diene and mixed isomers of dihydromyrcene. Nonlimiting examples of cyclic dienes include monocyclic dienes such as 1,4-cyclohexadiene, 1,5-cyclooctadiene and 1,5-cyclododecadiene; multi-ring alicyclic fused and bridged ring dienes, such as tetrahydroindene and methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene.

In an embodiment, the nonconjugated polyene is absent a heteroatom. The term "heteroatom," as used herein, is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

In an embodiment, the nonconjugated polyene is ENB.

In an embodiment, the terpolymer comprises only one type of non-conjugated polyene. The single type of non-conjugated polyene is void, or absent of a heteroatom.

In an embodiment, the terpolymer is an ethylene/propylene/norbornene terpolymer. In a further embodiment, the terpolymer is an ethylene/propylene/ENB terpolymer. The term "EPDM," as used herein, is the ethylene/propylene/ENB terpolymer having only three monomers, and the ENB being the sole diene in the terpolymer.

In an embodiment, the terpolymer is a neat terpolymer. The term "neat," as used herein, indicates a material that has no oil within, or upon, its structure. The term "neat," as used herein, interchangeably indicates a material that is "oil-free." In an embodiment, the EPDM is a neat EPDM, (i.e., "n-EPDM").

In an embodiment, n-EPDM used herein is produced with a metallocene catalyst as described in U.S. Pat. No. 8,101, 696 the entire contents of which is incorporated by reference herein.

The n-EPDM has a Mooney viscosity less than 100 MU. In an embodiment, the n-EPDM has a Mooney viscosity from 20 MU, or 30 MU, or 40 MU, or 50 MU, or 60 MU, or 65 MU, or 70 MU to 80 MU, or 85 MU, or 90 MU, or 99 MU. In a further embodiment, the n-EPDM has a Mooney viscosity from 20 to 99 MU, or from 30 to 99 MU, or from 60 to 80 MU.

In an embodiment, the n-EPDM has a Mooney relaxation area (MLRA), from 25 Mooney unit-seconds (MU·s), or 30 MU·s, or 180 MU·s to 280 MU·s, or 475 MU·s, or 510 MU·s, or 550 MU·s. In a further embodiment, the n-EPDM has a MLRA from 25 to 550 MU·s, or from 30 to 475 MU·s, or from 180 to 280 MU·s.

In an embodiment, the n-EPDM has an MLRA/ML ratio from 0.5 seconds (s), or 1 s, or 2 s, or 3 s, or 3.3 s to 4 s or 4.5 s or 5 s, or 6 s, or 6.5 s, or 7 s, or 7.5 s or 8 s. In a further embodiment, the n-EPDM has an MLRA/ML ratio from 0.5 to 8 s, or from 2 to 6.6 s, or from 3 to 6 s.

In an embodiment, the n-EPDM has a rheology ratio (RR) from 20, or 25, or 30 or 35 to 40, or 45, or 50, or 55, or 60, or 65. In a further embodiment, the n-EPDM has an RR from 20 to 65, or from 25 to 60, or from 30 to 55.

The n-EPDM has a phase angle δ greater than, or equal to, 41°. In an embodiment, the n-EPDM has a phase angle δ from 41°, or 45°, or 50° to 60°, or 70°, or 85°. In a further embodiment, the n-EPDM has a phase angle δ from 41° to 85°, or from 45° to 70°, or from 50° to 60°.

In an embodiment, the n-EPDM comprises from 50 weight percent (wt %), or 55 wt %, or 60 wt %, or 68 wt % to 70 wt %, or 72 wt %, or 74 wt %, or 80 wt % polymerized ethylene. In a further embodiment, the n-EPDM comprises from 50 to 80 wt %, or from 60 to 74 wt %, or from 68 to 72 wt % polymerized ethylene. In an embodiment, the n-EPDM comprises from 23 wt %, or 25 wt %, to 27 wt %, or 30 wt %, or 35 wt %, or 38 wt % polymerized propylene. In a further embodiment, the n-EPDM comprises from 23 to 38 wt %, or from 25 to 35 wt %, or from 25 to 30 wt % polymerized propylene. In an embodiment, the n-EPDM comprises from 0.5 wt %, or 1 wt %, or 2 wt %, or 3 wt %, or 3.5 wt %, or 4 wt %, or 4.5 wt %, or 4.7 wt % to 5.1 wt %, or 5.5 wt %, or 6 wt %, or 7 wt %, or 8 wt %, or 8.5 wt %, or 9 wt % polymerized ENB. In a further embodiment, the n-EPDM comprises from 0.5 to 9 wt %, or from 0.5 to 8.5 wt %, or from 0.5 to 7 wt %, or from 4 to 5 wt % polymerized ENB. Weight percentages are based upon a total weight of the n-EPDM.

In an embodiment, the n-EPDM has a molecular weight distribution (MWD) from 1.8, or 2.0, or 2.2, or 2.4, or 2.6 to 3.1, or 3.2, or 3.5, or 4.0, or 5.0. In a further embodiment, the n-EPDM has an MWD from 1.8 to 5.0, or from 2.0 to 4.0, or from 2.2 to 3.5, or from 2.3 to 3.1.

The n-EPDM may comprise a combination of two or more embodiments as described herein.

The terpolymer may comprise a combination of two or more embodiments as described herein.

The process includes exposing the terpolymer (e.g., n-EPDM) to electron beam radiation. In an embodiment, the terpolymer (e.g., n-EPDM) is exposed at a dosage from 0.2 megaRad (MRad), or 0.3 MRad, or 0.4 MRad to 0.5 MRad, or 0.6 MRad, or 0.7 MRad, or 0.8 MRad, or 0.9 MRad, or 1 MRad, or 1.1 MRad, or 1.2 MRad, or 1.3 MRad, or 1.5 MRad. In a further embodiment, the terpolymer (e.g., n-EPDM) is exposed at a dosage from 0.2 to 1.3 MRad, or from 0.3 to 1.2 MRad, or from 0.3 to 0.9 MRad, or from 0.3 to 0.7 MRad, or from 0.4 to 0.5 MRad.

In an embodiment, the terpolymer (e.g., n-EPDM) is exposed for a dosage time from 1 milliseconds (ms), or 2 ms, or 4 ms, or 6 ms, or 8 ms, or 10 ms to 12 ms, or 14 ms, or 18 ms, or 20 ms, or 30 ms, or 100 ms. In a further embodiment, the terpolymer (e.g., n-EPDM) is exposed for a dosage time from 1 to 100 ms, or from 2 to 30 ms, or from 4 to 20 ms, or from 10 to 20 ms.

In an embodiment, the process utilizes a linear electron beam accelerator. The terpolymer is exposed to the electron beam radiation in an ambient air environment. The linear electron beam accelerator operates at an energy range of 4.5 MeV, a beam power over the whole energy range of 150 kW, a beam energy spread of +1–10 percent and an average current of 30 milliamps (mA).

The process includes forming a branched terpolymer (i.e., b-terpolymer). The branched terpolymer is interchangeably referred to as an irradiated terpolymer. The branched terpolymer is a branched ethylene/α-olefin/non-conjugated polyene terpolymer. The α-olefin of the branched ethylene/α-olefin/non-conjugated polyene terpolymer is any α-olefin as described herein. The non-conjugated polyene of the branched ethylene/α-olefin/non-conjugated polyene terpolymer is any non-conjugated polyene as described herein. In an embodiment, the branched terpolymer is a branched ethylene/propylene/ENB terpolymer. The term, "b-EPDM," as used herein, is the branched ethylene/propylene/ENB terpolymer.

In an embodiment, the process includes forming a gel-free branched terpolymer. In a further embodiment, the process includes forming a gel-free b-EPDM.

In an embodiment, the branched terpolymer (e.g., b-EPDM), has a Mooney viscosity from 25 MU, or 35 MU, or 45 MU, or 55 MU, or 75 MU, or 95 MU, or 100 MU, or 105 MU, or 110 MU to 115 MU, or 120 MU, or 122 MU, or 125 MU, or 130 MU, or 135 MU. In a further embodiment, the b-EPDM has a Mooney viscosity from 25 to 135 MU, or from 35 to 120 MU, or from 45 to 110 MU. The irradiated terpolymer (e.g., b-EPDM) has an increased Mooney viscosity compared to the non-irradiated terpolymer.

In an embodiment, the branched terpolymer (e.g., b-EPDM), has a Mooney relaxation area (MLRA), from 220 MU·s, or 280 MU·s, or 315 MU·s to 940 MU·s, or 1800 MU·s, or 2300 MU·s. In a further embodiment, the b-EPDM has a MLRA from 220 to 2300 MU·s, or from 280 to 1800

MU·s, or from 315 to 940 MU·s. The irradiated terpolymer (e.g., b-EPDM) has an increased MLRA compared to the non-irradiated terpolymer (e.g., n-EPDM).

In an embodiment, the branched terpolymer (e.g., b-EPDM), has an MLRA/ML ratio from 7 s, or 8 s, or 9 s, or 10 s to 12 s, or 13 s, or 15 s, or 20 s, or 24 s, or 26 s, or 30 s. In a further embodiment, the b-EPDM has a MLRA/ML value from 7 to 30 s, or from 7 to 26 s, or from 10 to 15 s. The irradiated terpolymer (e.g., b-EPDM) has an increased MLRA/ML ratio compared to the non-irradiated terpolymer. Bounded by no particular theory, the MLRA/ML ratio is considered as a relaxation time associated with the degree of melt elasticity of the terpolymer. Long chain branching (LCB), can slow relaxation of the terpolymer and increase the MLRA/ML ratio. The increased MLRA/ML ratio indicates that the irradiated terpolymer contains more LCB compared to the non-irradiated n-EPDM (e.g., n-EPDM).

In an embodiment, the branched terpolymer (e.g., b-EPDM), has a rheology ratio (RR) from 55, or 60, or 70, or 80, or 90, or 95, or 100 to 105, or 110. In a further embodiment, the b-EPDM has an RR from 55 to 110, or from 60 to 105, or from 70 to 100, or from 80 to 95. The irradiated terpolymer (e.g., b-EPDM) has an increased RR value compared to the non-irradiated terpolymer. Bounded by no particular theory, the increased RR value indicates that the irradiated terpolymer is more highly shear thinning compared to the non-irradiated n-EPDM. The increased RR value indicates that the irradiated terpolymer contains more LCB compared to the non-irradiated n-EPDM.

In an embodiment, the branched terpolymer (e.g., b-EPDM), has a phase angle δ from 20°, or 22°, or 25°, or 27°, or 29° to 30°, or 31°, or 32°, or 35°, or 37°, or 39°. In a further embodiment, the b-EPDM has a phase angle δ from 20° to 39°, or from 22° to 37°, or from 25° to 35°. Bounded by no particular theory, it is believed that the irradiated terpolymer (e.g., b-EPDM) has a decreased phase angle δ value compared to the non-irradiated n-EPDM. The decreased phase angle δ value indicates that the irradiated terpolymer is more elastic compared to the non-irradiated n-EPDM.

In an embodiment, the branched terpolymer (e.g., b-EPDM), has a density from greater than, or equal to 0.85 g/cc, or 0.86 g/cc to less than, or equal to, 0.88 g/cc or 0.89 g/cc. In a further embodiment, the b-EPDM has a density from 0.85 to less than 0.89 g/cc, or from 0.86 to 0.88 g/cc.

In an embodiment, the branched terpolymer (e.g., b-EPDM), comprises vanadium. In an embodiment, the b-EPDM has a vanadium content from greater than, or equal to, 0 parts per million (ppm), or 0.1 ppm to less than, or equal to, 0.7 ppm or 0.82 ppm, or 0.9 ppm. In a further embodiment, the b-EPDM has a vanadium content from 0 to 0.9 ppm or from 0 ppm to less than 0.82 ppm. In an embodiment, the b-EPDM comprises vanadium in an amount less than 0.82 ppm.

In an embodiment, the branched terpolymer (e.g., b-EPDM), comprises chlorine. In an embodiment, the b-EPDM has a chlorine content from greater than, or equal to, 0 parts per million (ppm), or 10 ppm to 15 ppm, or 30 ppm. In a further embodiment, the b-EPDM has a chlorine content from 0 to 30 ppm or from 0 to 15 ppm.

In an embodiment, the branched terpolymer (e.g., b-EPDM), comprises from 54 weight percent (wt %), or 55 wt %, or 60 wt % to 65 wt %, or 68 wt % to 72 wt % polymerized ethylene; from 23 wt %, or 25 wt % to 30 wt %, or 40 wt %, or 50 wt %, or 55 wt % polymerized propylene; and from 0.3 wt %, or 0.5 wt %, or 1 wt %, or 2 wt %, or 3 wt %, or 3.5 wt %, or 4 wt %, or 4.5 wt %, or 4.7 wt % to 5.1 wt %, or 5.5 wt %, or 6 wt %, or 7 wt %, or 8 wt %, or 8.6 wt % polymerized ENB. In a further embodiment, the b-EPDM comprises from 54 to 72 wt %, or from 60 to 68 wt % polymerized ethylene; from 23 to 55 wt %, or from 25 to 50 wt % polymerized propylene; and from 0.3 to 8.6 wt %, or from 0.5 to 8 wt % polymerized ENB. Weight percentages are based upon a total weight of the b-EPDM. Bounded by no particular theory, it is believed that the irradiated terpolymer (e.g., b-EPDM) has negligible reduction in ENB content compared to the non-irradiated n-EPDM. The lack of decrease in ENB content indicates an absence of crosslinking in the irradiated terpolymer.

In an embodiment, the branched terpolymer (e.g., b-EPDM), has an MWD from 2.3, or 2.6, or 3.0, or 3.3 to 4.2, or 5.6, or 6. In a further embodiment, the b-EPDM has an MWD from 2.3 to 6, or from 2.6 to 5.6, or from 3.3 to 4.2.

In an embodiment, the branched terpolymer (e.g., b-EPDM), has a mass recovery as determined by the HT GPC test. In an embodiment, the b-EPDM has a mass recovery greater than, or equal to, 80%. In a further embodiment, the b-EPDM has a mass recovery from 80%, or 85%, or 90% to 95%, or 96%, or 97%, or 98%, or 99%, or 100%. In another embodiment, the b-EPDM has a mass recovery from 80% to 100%, or from 85% to 100%, or from 97% to 100%.

In an embodiment, the process includes:

(1) providing a neat ethylene/propylene/norbornene terpolymer comprising (i) from 50 to 80 wt % polymerized ethylene, (ii) from 23 to 38 wt % polymerized propylene, and (iii) from 0.5 to 9 wt % polymerized ENB, wherein weight percentages are based upon a total weight of the terpolymer;

(2) exposing the neat ethylene/propylene/norbornene terpolymer to electron beam radiation at a dosage from 0.3 to 0.7 MRad; and (3) forming a branched ethylene/propylene/norbornene terpolymer having (A) a Mooney viscosity from 35 to 120 MU, or from 45 to 110 MU, or from 55 to 105 MU, (B) a rheology ratio at 125° C. from 55 to 110, or from 60 to 105, or from 70 to 100, and (C) a phase angle δ from 28° to 39°, or from 22° to 37°, or from 25° to 35°.

The process may comprise two or more embodiments disclosed herein.

Composition

The present disclosure provides a composition. In an embodiment, the composition comprises a branched ethylene/propylene/non-conjugated polyene terpolymer. The branched terpolymer has a Mooney viscosity (ML 1+4 @125° C.) from 35 Mooney units (MU) to 120 MU. The branched terpolymer has a rheology ratio from 55 to 110. The branched terpolymer has a phase angle δ from 20° to 39°.

In an embodiment, the branched terpolymer is the branched ethylene/propylene/ENB terpolymer (i.e., b-EPDM), previously described herein.

In an embodiment, the b-EPDM is a neat b-EPDM. In a further embodiment, the b-EPDM is a neat and a gel-free b-EPDM.

In an embodiment, the composition comprises the branched terpolymer (e.g., b-EPDM), in an amount from 5 wt %, or 10 wt %, or 15 wt % to 18 wt %, or 30 wt %, or 50 wt % based a total weight of the composition. In a further embodiment, the composition comprises the branched terpolymer (e.g., b-EPDM), in an amount from 5 to 50 wt %, or from 10 to 30 wt %, or from 15 to 18 wt % based a total weight of the composition.

In an embodiment, the composition comprises a neat branched terpolymer, (e.g., b-EPDM), having from 68 to 72 wt % polymerized ethylene and from 4.7 to 5 wt % polymerized ENB, the branched terpolymer having one, some, or all of the following properties:

(i) a Mooney viscosity, ML(1+4) at 125° C., from 36 to 121 MU; and/or (ii) a rheology ratio V0.1/V100 at 125° C. (RR) from 62 to 102; and/or (iii) a phase angle δ from 31° to 36°; and/or (iv) a Mooney relaxation area (MLRA), from 240 to 1795 MU·s; and/or (v) an MLRA/ML ratio from 7 to 15 s.

In an embodiment, the composition comprises a neat branched terpolymer, (e.g., b-EPDM), having from 69 to 71 wt % polymerized ethylene and from 0.3 to 0.35 wt % polymerized ENB, the branched terpolymer having one, some or all of the following properties:

(i) a Mooney viscosity, ML(1+4) at 125° C., from 56 to 63 MU; and/or (ii) a rheology ratio V0.1/V100 at 125° C. (RR) from 64 to 87; and/or (iii) a phase angle δ from 31° to 37°; and/or (iv) a Mooney relaxation area (MLRA), from 348 to 630 MU·s; and/or (v) an MLRA/ML ratio from 7 to 10 s.

In an embodiment, the composition comprises a neat branched terpolymer, (e.g., b-EPDM), having from 54 to 55 wt % polymerized ethylene and from 8 to 9 wt % polymerized ENB, the branched terpolymer having one, some or all of the following properties:

(i) a Mooney viscosity, ML(1+4) at 125° C., from 37 to 103 MU; and/or (ii) a rheology ratio V0.1/V100 at 125° C. (RR) from 57 to 107; and/or (iii) a phase angle δ from 32° to 38°; and/or (iv) a Mooney relaxation area (MLRA), from 315 to 2005 MU·s; and/or (v) an MLRA/ML ratio from 8 to 20 s.

In an embodiment, the composition has a vanadium content from greater than, or equal to, 0 parts per million (ppm), or 0.1 ppm to less than, or equal to, 0.7 ppm or 0.82 ppm, or 0.9 ppm. In a further embodiment, the b-EPDM has a vanadium content from 0 to 0.9 ppm or from 0 ppm to less than 0.82 ppm. In an embodiment, the composition comprises vanadium in an amount less than 0.82 ppm.

In an embodiment, the composition has a chlorine content from greater than, or equal to, 0 parts per million (ppm), or 10 ppm to 15 ppm, or 30 ppm. In a further embodiment, the b-EPDM has a chlorine content from 0 to 30 ppm or from 0 to 15 ppm.

Additives

The present composition may optionally contain one or more additives.

In an embodiment, the composition includes the b-EPDM and an oil. The b-EPDM can be any b-EPDM previously disclosed herein. Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and combinations thereof. In a further embodiment, the oil is selected from the group consisting of SUNPAR 2280, PARALUX 6001, HYDROBRITE 550, and CALSOL 5550.

In an embodiment, the composition comprises the oil in an amount from 5 wt %, or 15 wt %, or 20 wt % to 30 wt %, or 40 wt %, or 70 wt % based a total weight of the composition. In a further embodiment, the composition comprises the oil in an amount from 5 to 70 wt %, or from 15 to 40 wt %, or from 20 to 30 wt % based a total weight of the composition.

The oil may comprise a combination of two or more embodiments as described herein.

In an embodiment, the composition includes the b-EPDM and an additive. The b-EPDM can be any b-EPDM previously disclosed herein. Suitable additives include, but are not limited to, fillers, antioxidants and antiozonants, UV stabilizers, flame retardants, colorants or pigments, curing agents (e.g., sulphur, peroxides), accelerators, coagents, processing aids, blowing agents, plasticizers and combinations thereof.

Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; polyethylene glycol (PEG); sulfur; stearic acid; sulfonamide; alumina trihydrate; magnesium hydroxide; precipitated silica; fumed silica; natural fibers; synthetic fibers; and combinations thereof.

Antioxidants and antiozonants include, but are not limited to, hindered phenols, bisphenols, and thiobisphenols; and substituted hydroquinones.

In an embodiment, the composition includes the b-EPDM and calcium carbonate. In an embodiment, the calcium carbonate is present in an amount from 5 wt %, or 15 wt %, or 20 wt % to 30 wt %, or 40 wt %, or 70 wt % based a total weight of the composition. In a further embodiment, the calcium carbonate is present in an amount from 5 to 70 wt %, or from 15 to 40 wt %, or from 20 to 30 wt % based a total weight of the composition.

In an embodiment, the composition includes the b-EPDM and carbon black. In an embodiment, the carbon black is present in an amount from 5 wt %, or 15 wt %, or 20 wt % to 30 wt %, or 40 wt %, or 70 wt % based a total weight of the composition. In a further embodiment, the carbon black is present in an amount from 5 to 70 wt %, or from 15 to 40 wt %, or from 20 to 30 wt % based a total weight of the composition.

In an embodiment, the composition comprises an aggregate additive load, the load excluding calcium carbonate and carbon black. In an embodiment, the aggregate additive load is present in an amount from 0.5 wt %, or 1 wt %, or 2 wt % to 4 wt %, or 5 wt %, or 10 wt % based a total weight of the composition. In a further embodiment, the aggregate additive load is present in an amount from 0.5 to 10 wt %, or from 1 to 5 wt %, or from 2 to 4 wt % based a total weight of the composition.

The additive may comprise two or more embodiments disclosed herein.

The aggregate additive load may comprise two or more embodiments disclosed herein.

In an embodiment, the composition comprises the branched terpolymer (e.g., b-EPDM), in an amount from 5 wt %, or 10 wt %, or 15 wt % to 18 wt %, or 30 wt %, or 50 wt % based a total weight of the composition. In a further embodiment, the composition comprises the branched terpolymer (e.g., b-EPDM), in an amount from 5 to 50 wt %, or from 10 to 30 wt %, or from 15 to 18 wt % based a total weight of the composition.

The composition may comprise two or more embodiments disclosed herein.

The composition can be used to form an article. Nonlimiting examples of articles that can be formed with the composition include belts, cable, extruder profiles, hose, molded goods, roofing membranes, sponges, tires, weather stripping, and wire.

The present disclosure is described more fully through the following examples. Unless otherwise noted, all parts and percentages are by weight.

EXAMPLES

The raw materials used to formulate the Comparative Samples ("CS") and the Inventive Examples ("IE") are provided in Table 1 below.

TABLE 1

| Trade Name | Description | Supplier |
| --- | --- | --- |
| NORDEL 4725 | 70 wt % $C_2H_4$; 5.0 wt % ENB; 25 MU | The Dow Chemical Company |
| NORDEL 4760 | 67.5 wt % $C_2H_4$; 5.0 wt % ENB; 60 MU | The Dow Chemical Company |
| NORDEL 4770 | 70 wt % $C_2H_4$; 5.0 wt % ENB; 70 MU | The Dow Chemical Company |
| NORDEL 3745 | 70 wt % $C_2H_4$; 0.5 wt % ENB; 45 MU | The Dow Chemical Company |
| NORDEL 4785 | 68 wt % $C_2H_4$; 4.9 wt % ENB; 85 MU | The Dow Chemical Company |
| NORDEL 6530 | 55 wt % $C_2H_4$; 8.5 wt % ENB; 30 | The Dow Chemical Company |
| NORDEL 6565 | 55 wt % $C_2H_4$; 8.5 wt % ENB; 65 MU | The Dow Chemical Company |
| Royalene 539 | 70.6 wt % $C_2H_4$; 4.6 wt % ENB; 70 MU | Lion Copolymer LLC |
| Royalene 539HM | 70.6 wt % $C_2H_4$; 4.6 wt % ENB; 80 MU | Lion Copolymer LLC |

Comparative Samples CS1, CS4, CS9, CS12, CS15, CS18 and CS19 are non-irradiated base neat EPDMs used as received. Comparative Samples CS7 and CS8 are Z-N catalyzed neat EPDMs used as received. See Table 2.

Branched EPDMs (b-EPDMs) are produced by irradiating the neat EPDMs for a dosage time from 10 to 20 milliseconds (ms) using a DYNAMITRON linear electron beam accelerator in air (Table 2) The operating parameters of the electron-beam accelerator are: an energy range of 4.5 MeV, a beam power over the whole energy range of 150 kW, a beam energy spread of +1−10 percent and an average current of 30 milliamps (mA).

Comparative Samples CS2 and CS3 are produced by irradiating CS1. Comparative Samples CS6, CS11, CS14, and CS17 are produced by irradiating CS4, CS9, CS12 and CS15, respectively.

Inventive Examples IE1 and IE2 are produced by irradiating CS1. Inventive Examples IE3 and IE4 are produced by irradiating CS4. Inventive Examples IE5 and IE6 are produced by irradiating CS9 and CS12, respectively. Inventive Examples IE7 and IE8 are produced by irradiating CS15.

Inventive Examples IE9 and IE10 are produced by irradiating CS18. Inventive Examples IE11 and IE12 are produced by irradiating CS19.

Table 2 summarizes the results of irradiation upon a range of properties for the Comparative Samples and the Inventive Examples. Table 2 includes vanadium content (V) and chlorine content (CI) from the residual elemental analysis test. The abbreviation N.M. indicates that a property was not measured for the indexed sample.

A mass recovery of 100 percent demonstrates chain branching is present in the absence of crosslinking in the b-EPDMs.

It is specifically intended that the present disclosure not be limited to the embodiments and illustrations contained herein, but include modified forms of those embodiments including portions of the embodiments and combinations of elements of different embodiments as come with the scope of the following claims.

TABLE 2

| ID | Description | Dosage (MRad) | MV (MU) | MLRA, (MU · s) | MLRA/ ML (s) | RR | δ (°) | MWD | den-sity (g/cc) | V (ppm) | Cl (ppm) | M-REC (%) | C2 (wt %) | C3 (wt %) | ENB (wt %) |
|---|---|---|---|---|---|---|---|---|---|---|---|---|---|---|---|
| CS1 | NORDEL 4725 | 0 | 24.8 | 36 | 1.5 | 26.1 | 46 | 3.11 | 0.88 | N.M. | N.M. | 100 | 71.43 | 23.54 | 5.03 |
| CS2 | NORDEL 4725: 0.3 | 0.3 | 28.7 | 90 | 3.1 | 42.3 | 41 | 3.39 | 0.88 | N.M. | N.M. | 100 | 71.91 | 23.28 | 4.82 |
| IE1 | NORDEL 4725: 0.7 | 0.7 | 36.9 | 242 | 6.6 | 62.2 | 36 | 4.19 | 0.88 | N.M. | N.M. | 100 | 71.55 | 23.51 | 4.94 |
| IE2 | NORDEL 4725: 1.1 | 1.1 | 48.3 | 635 | 13.1 | 93.8 | 32 | 5.56 | 0.88 | N.M. | N.M. | N.M. | 71.44 | 23.82 | 4.74 |
| CS3 | NORDEL 4725: 1.5 | 1.5 | 79.9 | 1818 | 22.8 | 123.9 | 26 | N.M. | 0.88 | N.M. | N.M. | <85 | N.M. | N.M. | N.M. |
| CS4 | NORDEL 4760 | 0 | 59.5 | 210 | 3.5 | 45.0 | 46 | 2.71 | 0.88 | <0.82 | 7.6 | 100 | 68.14 | 27.1 | 4.76 |
| CS5 | NORDEL 4760: 0.3 | 0.3 | 66.9 | 423 | 6.3 | 60.4 | 40 | 3.05 | 0.88 | <0.82 | <5 | 99 | 68.14 | 27.2 | 4.66 |
| IE3 | NORDEL 4760: 0.5 | 0.5 | 78.5 | 828 | 10.5 | 79.2 | 35 | 3.61 | 0.88 | N.M. | N.M. | 97 | N.M. | N.M. | N.M. |
| IE4 | NORDEL 4760: 0.7 | 0.7 | 81.1 | 937 | 11.5 | 84.2 | 34 | 3.77 | 0.88 | <0.82 | <5 | 98 | 68.04 | 27.19 | 4.77 |
| CS6 | NORDEL 4760: 1.5 | 1.5 | 163.1 | 5190 | 31.8 | 155.3 | 22 | N.M. | 0.88 | N.M. | N.M. | <85 | N.M. | N.M. | N.M. |
| CS7 | Royalene 539 | 0 | 68.3 | 332 | 4.9 | 50.8 | 45 | N.M. | 0.88 | 4.59 | 57.1 | N.M. | N.M. | N.M. | N.M. |
| CS8 | Royalene 539HM | 0 | 86.5 | 510 | 5.9 | 59.0 | 46 | N.M. | 0.88 | 5.6 | 65.8 | N.M. | N.M. | N.M. | N.M. |
| CS9 | NORDEL 4770 | 0 | 69.4 | 184 | 2.7 | 42.5 | 48 | 2.61 | 0.88 | N.M. | N.M. | 100 | N.M. | N.M. | N.M. |
| CS10 | NORDEL 4770: 0.3 | 0.3 | 79.2 | 473 | 6.0 | 61.0 | 41 | 3.01 | 0.88 | N.M. | N.M. | 99 | 71.25 | 23.87 | 4.88 |
| IE5 | NORDEL 4770: 0.7 | 0.7 | 107.4 | 1575 | 14.7 | 102.2 | 31 | 4.28 | 0.88 | N.M. | N.M. | 96 | 71.18 | 24.07 | 4.75 |
| CS11 | NORDEL 4770: 1.5 | 1.5 | 162.2 | 8308 | 51.2 | N.M. | N.M. | N.M. | 0.88 | N.M. | N.M. | <85 | N.M. | N.M. | N.M. |
| CS12 | NORDEL 4785 | 0 | 83.8 | 276 | 3.3 | 43.7 | 50 | 2.37 | 0.88 | <0.82 | 6.5 | 100 | N.M. | N.M. | N.M. |
| CS13 | NORDEL 4785: 0.3 | 0.3 | 94.2 | 535 | 5.7 | 62.6 | 44 | 2.57 | 0.88 | <0.82 | 8.3 | 97 | 69.14 | 25.81 | 5.05 |
| IE6 | NORDEL 4785: 0.7 | 0.7 | 120.4 | 1793 | 14.9 | 99.8 | 33 | 3.53 | 0.88 | <0.82 | <5 | 100 | 68.97 | 26.15 | 4.88 |
| CS14 | NORDEL 4785: 1.5 | 1.5 | 165.1 | 9269 | 56.1 | N.M. | N.M. | N.M. | 0.88 | N.M. | N.M. | <85 | N.M. | N.M. | N.M. |
| CS15 | NORDEL 3745 | 0 | 41.1 | 143 | 3.5 | 38.5 | 45 | 2.39 | 0.88 | N.M. | N.M. | 100 | 69.83 | 29.67 | 0.5 |
| CS16 | NORDEL 3745: 0.3 | 0.3 | 48.7 | 221 | 4.5 | 49.3 | 41 | 2.45 | 0.88 | N.M. | N.M. | 100 | 69.94 | 29.74 | 0.31 |
| IE7 | NORDEL 3745: 0.7 | 0.7 | 53.6 | 349 | 6.5 | 64.0 | 37 | 2.90 | 0.88 | N.M. | N.M. | 100 | 70.07 | 29.61 | 0.32 |
| IE8 | NORDEL 3745: 1.1 | 1.1 | 62.8 | 629 | 10.0 | 86.9 | 31 | 3.42 | 0.88 | N.M. | N.M. | N.M. | 69.98 | 29.7 | 0.31 |
| CS17 | NORDEL 3745: 1.5 | 1.5 | 78.4 | 1292 | 16.5 | 126.2 | 25 | N.M. | 0.88 | N.M. | N.M. | <85 | N.M. | N.M. | N.M. |
| CS18 | NORDEL 6530 | 0 | 32.0 | 206 | 6.4 | 43.0 | 41 | 3.15 | 0.86 | <0.82 | 8.5 | 92 | 54.67 | 36.92 | 8.41 |
| IE9 | NORDEL 6530- 0.3 | 0.3 | 37.0 | 316 | 8.5 | 57.5 | 39 | 3.39 | 0.86 | <0.82 | <5 | 88 | 54.62 | 36.91 | 8.47 |
| IE10 | NORDEL 6530- 0.7 | 0.7 | 47.0 | 661 | 14.1 | 79.1 | 35 | 4.21 | 0.86 | <0.82 | <5 | 88 | 54.66 | 37.27 | 8.06 |
| CS19 | NORDEL 6565 | 0 | 66.0 | 472 | 67.2 | 63.5 | 41 | 2.86 | 0.86 | <0.82 | <5 | 88 | 54.69 | 36.49 | 8.81 |
| IE11 | NORDEL 6565- 0.3 | 0.3 | 74.0 | 681 | 9.1 | 81.6 | 37 | 3.12 | 0.86 | <0.82 | <5 | 90 | 54.67 | 36.79 | 8.55 |
| IE12 | NORDEL 6565- 0.7 | 0.7 | 103.0 | 2002 | 19.3 | 106.4 | 32 | 4.30 | 0.86 | <0.82 | 11.6 | 88 | 54.65 | 54.65 | 8.57 |

Table 2 shows that the b-EPDMs have increased MV values compared to the base EPDMs. For NORDEL 4760, NORDEL 4770, NORDEL 4785, and NORDEL 6565, MV increased from 59.5 MU to 81.1 MU (IE4), from 69.4 MU to 107.4 MU (IE5), from 83.8 MU to 120.4 MU (IE6), and from 66 MU to 103 MU (IE12, respectively, after being irradiated at a dosage of 0.7 MRad. The MV values of CS6 (163.1), CS11 (162.2 MU), and CS14 (165.1 MU) were accompanied by evidence of macro-gel formation that indicates that the b-EPDM has undesired crosslinking after being irradiated at a dosage of 1.5 MRad.

Applicant unexpectedly discovered that irradiating NORDEL 4770 at a dosage of 0.7 MRad (IE5), transformed the MV from 69.4 MU to 107.4, the RR from 42.5 to 102.2, and the phase angle δ from 48 to 31. Irradiating NORDEL 4785 at a dosage of 0.7 MRad (IE6), transformed the MV from 83.8 MU to 120.4, the RR from 43.7 to 99.8, and the δ from 50 to 33.

Table 2 summarizes the results of electron bean radiation upon values for molecular weight distribution (MWD) and mass recovery (M-REC). Applicant unexpectedly discovered that irradiating NORDEL 4725 (IE1), NORDEL 4785 (IE6), and NORDEL 3745 (IE7) at a dosage of 0.7 MRad produced a b-EPDM having a mass recovery of 100 percent.

We claim:

1. A process comprising:

providing a neat ethylene/propylene/non-conjugated polyene terpolymer (n-terpolymer) having a Mooney viscosity ML(1+4) at 125° C. less than 100 Mooney units (MU) and a phase angle δ greater than or equal to 41°;

exposing the n-terpolymer to electron beam radiation at a dosage from 0.2 megaRad (MRad) to 1.3 MRad; and forming a branched ethylene/propylene/non-conjugated polyene terpolym (b-terpolymer) having a Mooney viscosity ML (1+4) at 125° C. from 25 MU to 135 MU and a phase angle δ from 20° to 39°.

2. The process of claim 1 wherein the n-terpolymer has a rheology ratio from 20 to 65, the process comprising forming a b-terpolymer having a rheology ratio from 55 to 110.

3. The process of claim 1 comprising forming a b-terpolymer having a mass recovery greater than, or equal to, 85 percent.

4. The process of claim 1 comprising providing an n-terpolymer comprising from 0.5 to 9.0 weight percent non-conjugated polyene that is a cycloalkylidene norbornene; and forming a b-terpolymer comprising from 0.3 to 8.6 weight percent non-conjugated polyene that is the cycloalkylidene norbornene.

5. The process of claim 1 comprising providing a neat ethylene/propylene/5-ethylidene-2-norbornene terpolymer (n-EPDM) comprising (i) from 50 wt % to 80 wt % percent ethylene, (ii) from 23 to 38 weight percent propylene, and (iii) from 0.5 to 9.0 weight percent 5-ethylidene-2-norbornene;

exposing the n-EPDM to electron beam radiation at a dosage from 0.3 MRad to 0.7 MRad; and forming a branched ethylene/propylene/5-ethylidene-2-norbornene terpolymer (b-EPDM) having (A) a Mooney viscosity ML (1+4) at 125° C. from 35 MU to 120 MU, (B) a rheology ratio from 55 to 110, and (C) a phase angle $\delta$ from 25° to 39°.

6. The process of claim 1 comprising providing the n-terpolymer wherein the n-terpolymer comprises only one non-conjugated polyene and the non-conjugated polyene is absent atoms other than carbon or hydrogen.

\* \* \* \* \*